(12) United States Patent
Choi et al.

(10) Patent No.: US 9,544,724 B2
(45) Date of Patent: *Jan. 10, 2017

(54) LOCATION-BASED INFORMATION SERVICE METHOD AND MOBILE TERMINAL THEREFOR

(71) Applicant: Samsung Electronics Co., Ltd., Suwon-si, Gyeonggi-do (KR)

(72) Inventors: Seung Min Choi, Suwon-si (KR); Sang Yoon Lee, Seoul (KR); Dae Gyu Kim, Seoul (KR); Jin Il Kim, Yongin-si (KR); Min Sook Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,584

(22) Filed: Jul. 21, 2014

(65) Prior Publication Data

US 2014/0329547 A1 Nov. 6, 2014

Related U.S. Application Data

(63) Continuation of application No. 12/363,224, filed on Jan. 30, 2009, now Pat. No. 8,787,928.

(30) Foreign Application Priority Data

Jan. 31, 2008 (KR) ........................ 10-2008-0010255

(51) Int. Cl.
*H04W 24/00* (2009.01)
*H04W 4/02* (2009.01)
*H04L 29/12* (2006.01)
*H04M 1/725* (2006.01)
(Continued)

(52) U.S. Cl.
CPC .......... *H04W 4/02* (2013.01); *H04L 29/12792* (2013.01); *H04L 61/60* (2013.01);
(Continued)

(58) Field of Classification Search
CPC ... H04W 64/00; H04W 4/02; H04L 29/08657; G01C 21/26; G08G 1/093
(Continued)

(56) References Cited

U.S. PATENT DOCUMENTS 8,401,003 B1 3/2013 Petit-Huguenin et al.
2002/0155844 A1 10/2002 Rankin et al.
(Continued)

FOREIGN PATENT DOCUMENTS

KR 2002-0014897 A 2/2002
KR 2004-0073811 A 8/2004
(Continued)

*Primary Examiner* — Danh Le
(74) *Attorney, Agent, or Firm* — Jefferson IP Law, LLP

(57) ABSTRACT

A location-based information service method for improving utilization of location-based information services and a mobile terminal for implementing the location-based information service method are provided. A method for providing an information service using a mobile terminal includes acquiring, at a mobile terminal, location information, determining an Internet Protocol (IP) address based on the location information, and receiving service information from a cyber space associated with a service provider that corresponds to the IP address.

18 Claims, 11 Drawing Sheets

(51) Int. Cl.
  *H04W 4/18* (2009.01)
  *H04L 29/08* (2006.01)
  *G08G 1/09* (2006.01)
(52) U.S. Cl.
  CPC ............ *H04L 61/609* (2013.01); *H04L 67/18* (2013.01); *H04M 1/72561* (2013.01); *H04M 1/72572* (2013.01); *H04W 4/022* (2013.01); *H04W 4/18* (2013.01); *G08G 1/093* (2013.01); *H04M 2250/10* (2013.01)
(58) Field of Classification Search
  USPC ... 455/456.5, 456, 6, 456.1, 456.3; 701/408; 725/46
  See application file for complete search history.

(56) References Cited

U.S. PATENT DOCUMENTS

| | | |
|---|---|---|
| 2002/0164952 A1 | 11/2002 | Singhal et al. |
| 2004/0181572 A1 | 9/2004 | Lee et al. |
| 2004/0203854 A1* | 10/2004 | Nowak .................. H04W 4/02 455/456.1 |
| 2004/0213409 A1 | 10/2004 | Murto et al. |
| 2005/0187708 A1* | 8/2005 | Joe ........................ G08G 1/092 701/431 |
| 2006/0199590 A1* | 9/2006 | Park ..................... H04W 48/18 455/445 |
| 2006/0206586 A1 | 9/2006 | Ling et al. |
| 2007/0006265 A1* | 1/2007 | Youm .................. G08G 1/093 725/46 |
| 2007/0049342 A1* | 3/2007 | Mayer .................... H04M 1/04 455/558 |
| 2008/0162037 A1 | 7/2008 | Hasan Mahmoud |
| 2008/0194260 A1* | 8/2008 | Altberg ................ G06Q 30/02 455/435.1 |

FOREIGN PATENT DOCUMENTS

| | | |
|---|---|---|
| KR | 10-2004-0099249 A | 11/2004 |
| KR | 2006-0008100 A | 1/2006 |

* cited by examiner

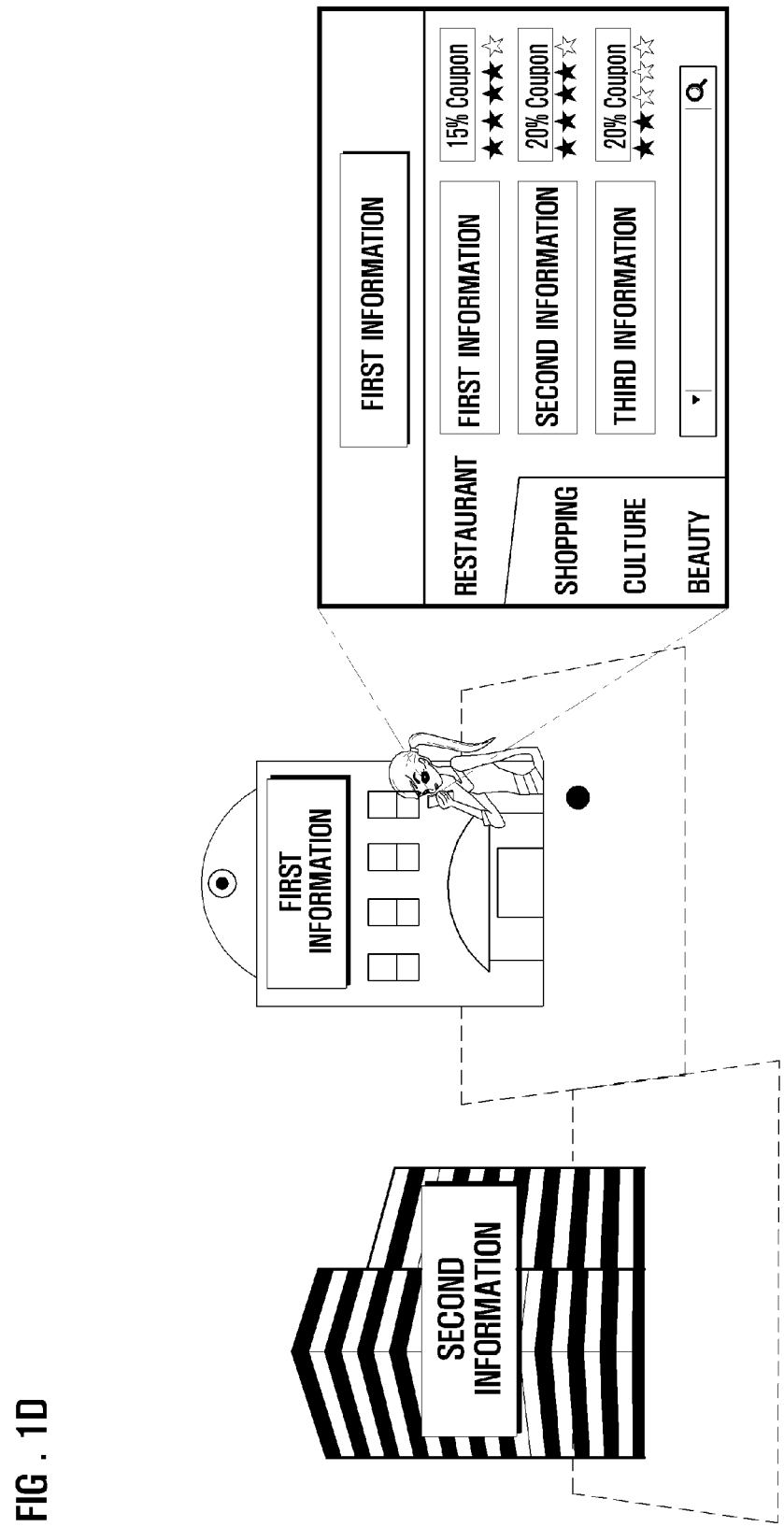

LOCATION-BASED INFORMATION SERVICE METHOD AND MOBILE TERMINAL THEREFOR

PRIORITY

This application is a continuation application of a prior application Ser. No. 12/363,224, filed on Jan. 30, 2009, which claimed the benefit under 35 U.S.C §119(a) of a Korean patent application filed on Jan. 31, 2008 in the Korean Intellectual Property Office and assigned Serial number 10-2008-0010255, the entire disclosure of which is hereby incorporated by reference.

BACKGROUND OF THE INVENTION

1. Field of the Invention

The present invention relates to a location-based service. More particularly, the present invention relates to a location-based service method and a mobile terminal for providing information services through a wireless connection to a cyber space of a service provider based on location information.

2. Description of the Related Art

With ongoing research and development, a mobile terminal is becoming a multifunctional device supporting various supplementary functions such as a digital camera, an alarm, a Short Messaging Service (SMS), a Multimedia Message Service (MMS), E-mail, Bluetooth communication, etc. along with the mobile terminal's basic communication function. In addition, the convergence of supplementary functions is increasing.

Recently, a Global Positioning System (GPS) is frequently used for providing users with practical services. A Location-Based Service (LBS) is a well-known technology for providing users with services based on their geographical locations.

Conventionally, the location based services are characterized in that the location information acquired by a mobile terminal is provided to a specific application installed in one of the mobile terminal and a remote server connected through one of a WEB and a Wireless Application Protocol (WAP) for producing useful information.

For instance, when the mobile terminal is equipped with a GPS receiver and a camera module, the mobile terminal can store a photograph taken by the camera module with the time and location where the photograph was taken, based on the mobile terminal's time and location information determined by the GPS receiver. Another example is a subway map application, which compares the location information acquired by the mobile terminal in real time with a predefined subway map data to identify the current location.

However, most of the conventional location-based services are limited in their ability to provide detailed and accurate information to satisfy the users' requirements. That is, the conventional location-based services provide the users with location information processed from the coordinates acquired by the mobile terminal. Accordingly, there has been a need to develop a system and method for providing the users with improved location-based services that can meet users' various requirements.

SUMMARY OF THE INVENTION

An aspect of the present invention is to address at least the above-mentioned problems and/or disadvantages and to provide at least the advantages described below. Accordingly, an aspect of the present invention is to provide an information service method that is capable of providing a mobile terminal with an information service provided by a service provider's cyber space via one of a WEB and a Wireless Application Protocol (WAP) using location information.

Another aspect of the present invention is to provide a location-based information service method that is capable of providing an information service to a mobile terminal by matching current location information with an Internet Protocol (IP) address of a service provider and enabling the mobile terminal to access a cyber space represented by the service provider's IP address.

Another aspect of the present invention is to provide a location-based information service method that enables a mobile terminal to convert current location information into an IP address and access a cyber space represented by the IP address automatically.

Another aspect of the present invention is to provide a location-based information service method that enables a mobile terminal to access a cyber space of a service provider of which an IP address is mapped to the mobile terminal's current location and to receive service information provided by the service provider in real time.

Still another aspect of the present invention is to provide a location-based information service method that is capable of allocating spatial coordinates to service providers and providing provider-specific service information to mobile terminals located at the spatial coordinates occupied by the service providers.

Still another aspect of the present invention is to provide a location-based information service method that is capable of providing mobile terminals located at spatial coordinates occupied by a service provider with service information of the service provider first.

In accordance with an aspect of the present invention, a method for providing an information service using a mobile terminal is provided. The method includes acquiring, at a mobile terminal, location information, determining an IP address based on the location information, and receiving service information from a cyber space associated with a service provider that corresponds to the IP address.

In accordance with another aspect of the present invention, a method for providing an information service using a mobile terminal is provided. The method includes extracting, when an information service function of a mobile terminal is activated, at least one coordinate from location information, searching for reference location information corresponding to the at least one coordinate from a mapping table, retrieving link information mapped to the reference location information from the mapping table, and accessing a cyber space of a service provider automatically using the link information.

In accordance with another aspect of the present invention, a method for providing an information service using a mobile terminal is provided. The method includes sending at least one coordinate of location information acquired at a location of a mobile terminal from the mobile terminal to a service server, receiving an IP address mapped to the at least one coordinate from the service server, and accessing a cyber space of a service provider corresponding to the IP address.

In accordance with another aspect of the present invention, a mobile terminal is provided. The terminal includes a location information reception unit for receiving location information of the mobile terminal from a positioning system, an input unit for receiving a control command to execute an information service function, a memory unit for storing at least one of applications and data associated with the information service function, location information, reference location information, and link information matched with the reference location information, a display unit for displaying service information provided from a cyber space, and a control unit for obtaining, when a function execution request is detected, the link information mapped to the location information and for accessing the cyber space of a service provider corresponding to the location information.

In accordance with another aspect of the present invention, a system for providing an information service based on location information is provided. The system includes a mobile terminal for accessing a cyber space corresponding to a location of the mobile terminal, a service server for allocating at least one spatial coordinate per cyber space and for mapping the at least one spatial coordinate into an IP address, and at least one service provider for allocating the at least one spatial coordinate and for providing service information to the mobile terminal at the at least one spatial coordinate through the cyber space.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 1a to 1d are schematic diagrams illustrating a location-based service system according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a mobile terminal connects to a cyber space, such as a website, using location information including latitude, longitude, and altitude of the mobile terminal to provide a user of the mobile terminal with various value added services. More particularly, the mobile terminal converts its location information into a service provider's Internet Protocol (IP) address and accesses the website identified by the IP address, thereby intuitively providing the user with useful information in real time.

The service provider can be any of a shopping center, a hotel, a department store, a theater, a restaurant, a hospital, a café, a public office, etc. and may provide information through its own cyber space. As aforementioned, the location information is the spatial coordinate composed of at least one of latitude value, longitude value, and altitude value that indicates the location of the mobile terminal. The location of the mobile terminal may be acquired by means of a Global Positioning System (GPS) or the like.

In the following description, the term "spatial coordinate" is interchangeably used with the terms "coordinate" and "location information." In addition, a service server is one of service servers allocated a unique spatial coordinate for providing location-based information services. The location-based information service system architecture is described in detail hereinafter with reference to the accompanying drawings.

Figure 1A:
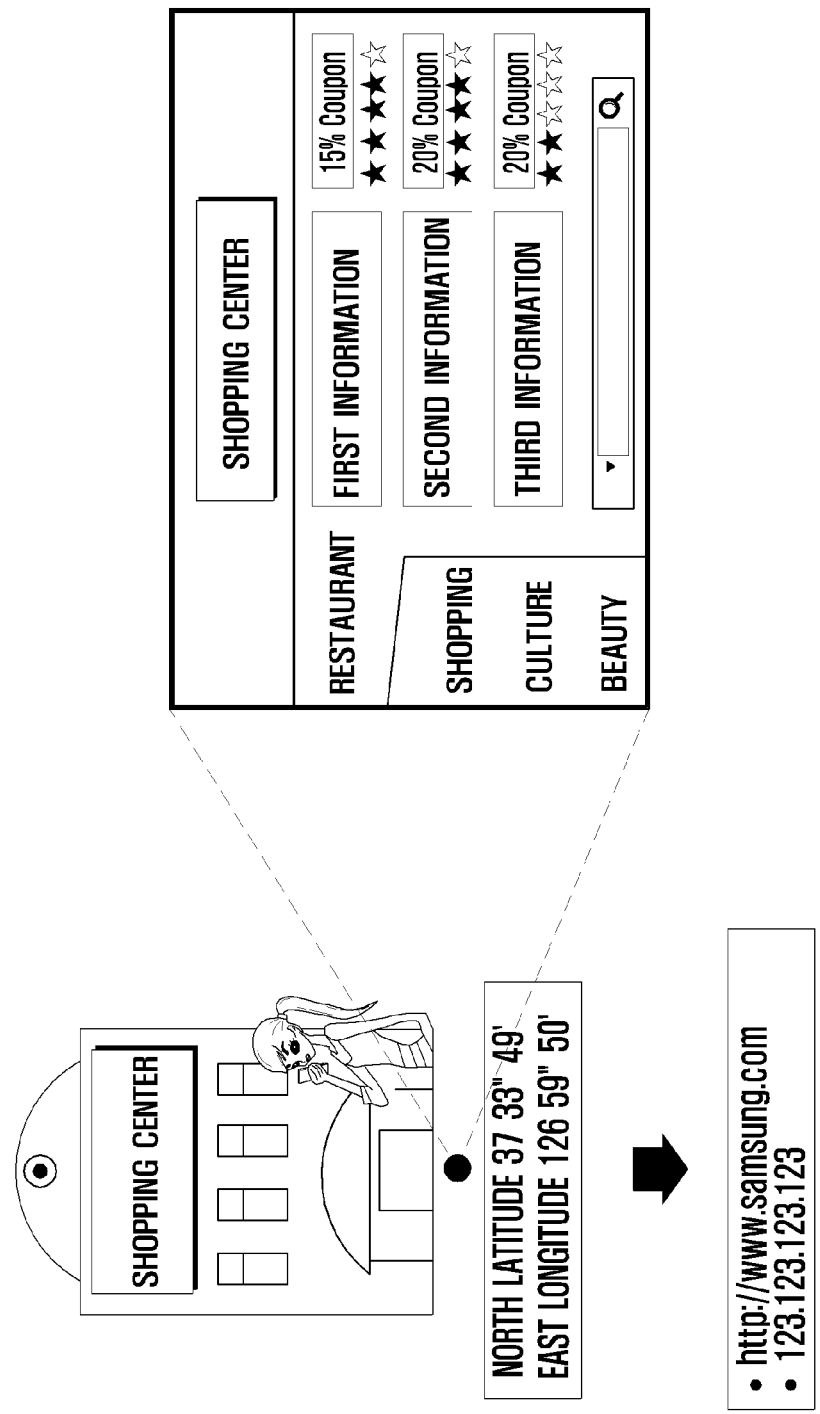
Figure 1B:
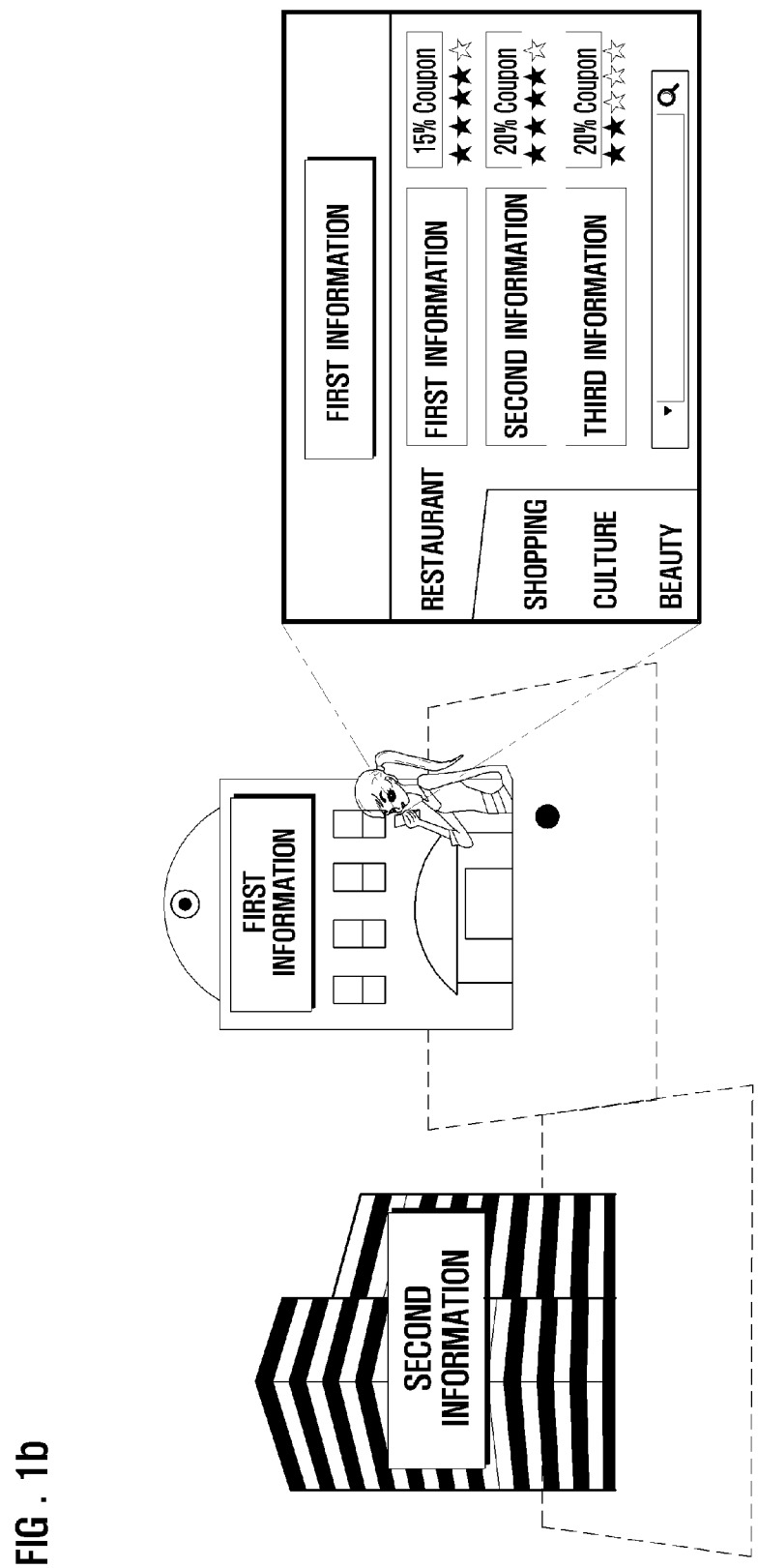
Figure 1C:
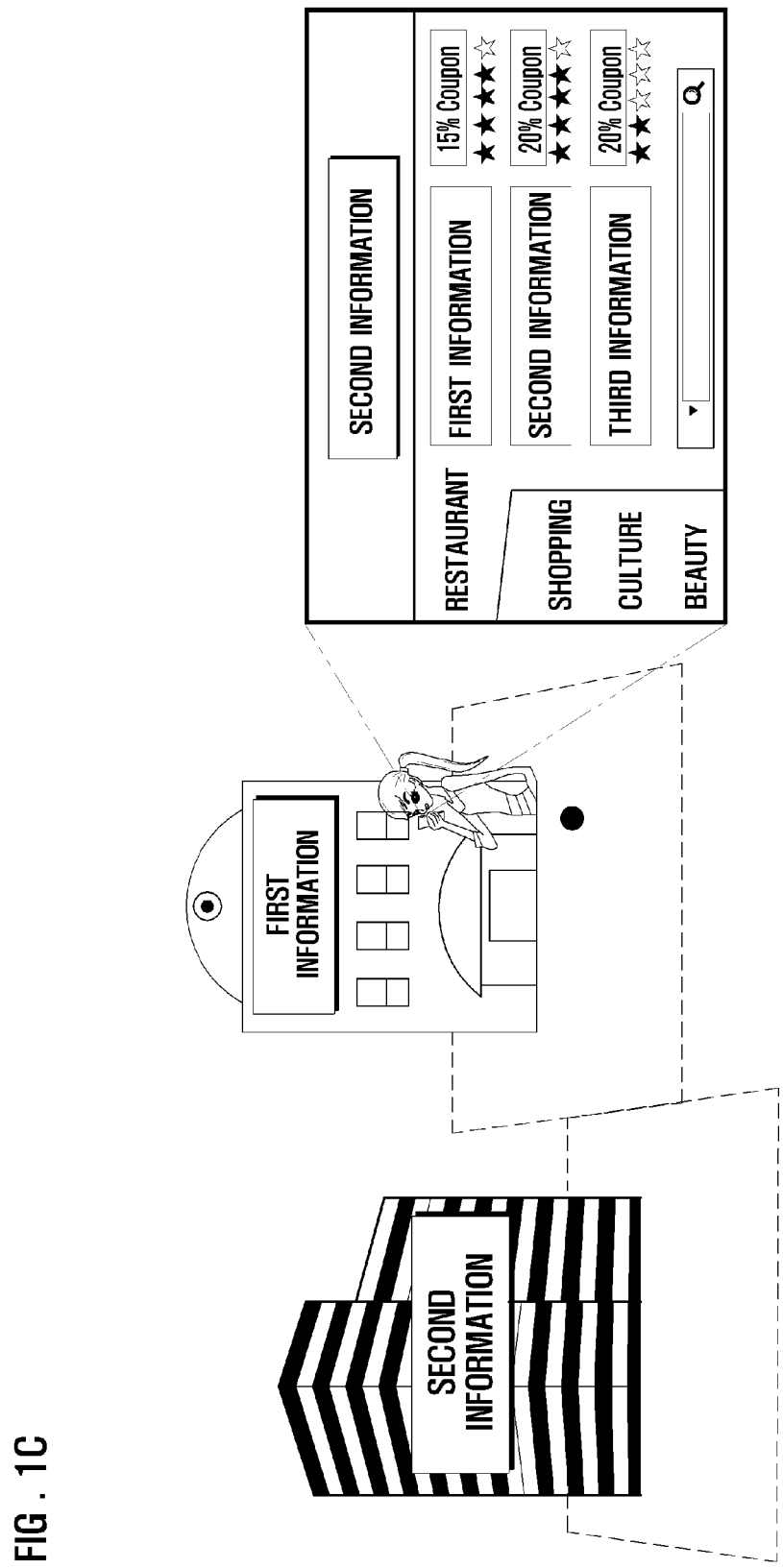

FIGS. 1a to 1d are schematic diagrams illustrating a location-based information service system according to an exemplary embodiment of the present invention. More particularly, FIG. 1a illustrates a conceptual architecture of a location-based information service system according to an exemplary embodiment of the present invention, and FIGS. 1b to 1d illustrate operations of the location-based information service system.

When a user activates a location-based information service function at a specific location represented by a spatial coordinate, the mobile terminal attempts Internet access to a cyber space of a service provider allocated the spatial coordinate. The access to the cyber space is performed by using an IP address matched with the spatial coordinate. The cyber space access operation is described hereinafter.

Referring to FIG. 1a, the mobile terminal acquires location information of its position and attempts to access the cyber space of a service provider with reference to the location information.

Once the location-based information service function is activated, the mobile terminal acquires its location information by means of its GPS receiver. The location information includes at least one of a latitude value, a longitude value, and an altitude value.

For example, the mobile terminal converts a spatial coordinate including a north latitude (37° 33" 49') and an east longitude 126° 59" 50') acquired by the GPS receiver into an IP address "123.123.123.123" represented by a service provider's domain of http://www.samsung.com.

Next, the mobile terminal accesses the service provider's domain IP address and outputs the information provided by the service provider. Here, the spatial coordinate may further include an altitude value. In a case where multiple service providers are placed in a building, the service provider can be identified with reference to the altitude value as well as the latitude and longitude values.

Referring to FIG. 1a, it is assumed that the specific shopping center, as a service provider, is matched with the location information. In this case, the mobile terminal accesses the cyber space of the shopping center and outputs information on the services provided by the shopping center. If the location information is matched with a restaurant as the service provider, then the mobile terminal accesses the cyber space of the restaurant to receive information associated with the restaurant, such as at least one of a menu, customers' opinions, a map, an advertisement, a discount, and a coupon.

FIGS. 1b to 1d provide examples of how a mobile terminal may access the cyber spaces of service providers based on the locations information acquired in substantially real time.

FIG. 1b illustrates an exemplary situation in which the location-based information service function is activated such that the mobile terminal accesses the cyber space of a first shopping center occupying the spatial coordinate of the mobile terminal's location.

FIG. 1c illustrates an exemplary situation in which the location-based function is activated such that the mobile terminal accesses the cyber space of a second shopping center occupying the spatial coordinate of the mobile terminal's location.

FIG. 1d illustrates an exemplary situation in which the mobile terminal accesses the cyber space of the first shopping center, even though the spatial coordinate of the mobile terminal is geographically occupied by the second shopping center.

When the first shopping center occupies the coordinate of the second shopping center, the mobile terminal accesses the cyber space of the first shopping center although it is located near the second shopping center. This means that the greater the number of coordinates the service provider occupies, the greater the number of opportunities is has for advertisements.

Figure 2:
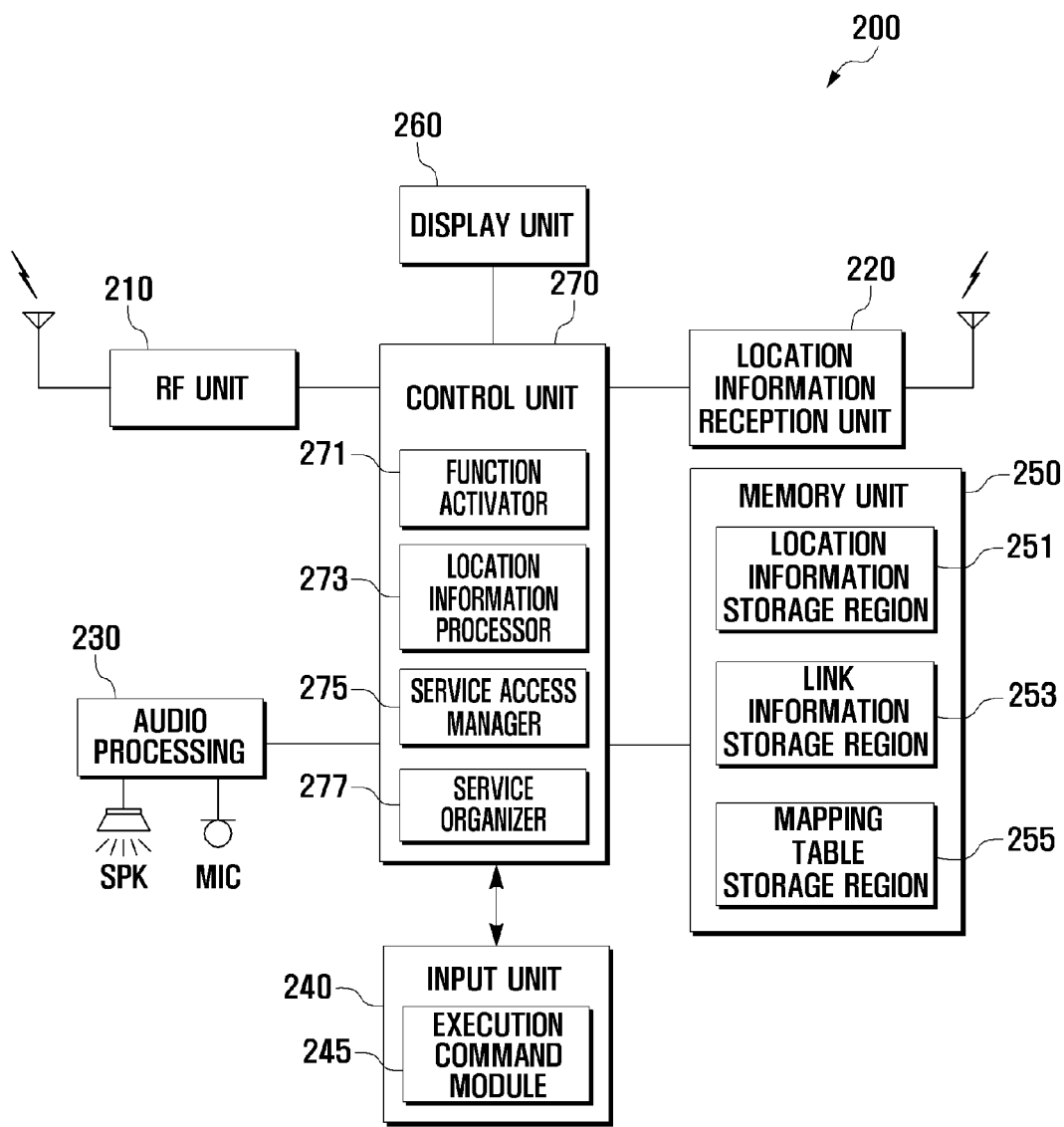
FIG. 2 is a block diagram illustrating a configuration of a mobile terminal for supporting a location-based service method according to an exemplary embodiment of the present invention.

FIG. 2 is a block diagram illustrating a configuration of a mobile terminal for supporting a location-based information service method according to an exemplary embodiment of the present invention.

Referring to FIG. 2, a mobile terminal 200 includes a Radio Frequency (RF) unit 210, a location information reception unit 220, an audio processing unit 230, an input unit 240, a memory unit 250, a display unit 260, and a control unit 270.

The RF unit 210 is responsible for radio communication of the mobile terminal 200. The RF unit 210 establishes radio channels with an access network for voice and data communication. The RF unit 210 includes an RF transmitter for up-converting and amplifying transmission signal frequency and an RF receiver for low noise amplifying and down-converting received signal frequency. More particularly, in an exemplary embodiment, the RF unit 210 is configured such that the mobile terminal 200 can access a cyber space under the control of the control unit 270.

The location information reception unit 220 receives location information from a positioning system. The positioning system can be a GPS, and the location information can be a spatial coordinate composed of at least one of a latitude value, a longitude value, and an altitude value. Although the location-based information service method is described with a mobile terminal 200 equipped with a GPS receiver as the location information reception unit 220, the present invention is not limited thereto. For example, the mobile terminal 200 can receive its location from a Base Station (BS) serving the mobile terminal 200. In addition, the mobile terminal 200 can acquire its location information in other various manners.

The audio processing unit 230 converts an analog voice signal input through a microphone (MIC) into a digital voice signal and converts a digital voice signal into an analog voice signal to be output through a speaker (SPK). More particularly, in an exemplary embodiment, the audio processing unit 230 is configured to process an audio signal received from a cyber space to which the mobile terminal 200 is connected.

The input unit 240 is provided with a plurality of alphanumeric keys for receiving alphanumeric data and function keys for configuring and executing various functions of the mobile terminal 200 and transfers the key signal generated by the manipulation of the keys to the control unit 270. The input unit 240 may further include separately implemented functions keys such as navigation keys, volume keys, and hot keys. More particularly, in an exemplary embodiment, the input unit 240 may include an execution command module 245 for transferring a control signal input in association with the location-based information service function to the control unit 270. The execution command module 245 may be implemented with the function keys so as to transfer a control signal input through one of the function keys to the control unit 270.

The memory unit 250 stores applications associated with the location-based information service function, application data generated by the applications and user data input by the user. The memory unit 250 can be provided with at least one buffer for buffering data generated by the applications.

The applications include at least one of an activation/deactivation processing application, an information conversion application for converting the location information into an IP address, a transport application for transporting the location information (spatial coordinate) to a service server, an access application for accessing a cyber space represented by the IP address, an update application for updating the information of the mobile terminal 200 with the spatial coordinate and IP address, and an output application for outputting a processed result of a predefined supplementary service.

The memory unit 250 includes a location information storage region 251 for storing the acquired or preset location information (spatial coordinate), a link information storage region 253 for storing the link information associated with location information, and a mapping table storage region 255 for storing the mapping table containing a map between the location information and the link information. Table 1 shows an exemplary mapping table.

TABLE 1

| Location information | Link information | Supplementary information |
|---|---|---|
| First coordinate | http://www.abcd.com | OOO shopping center |
| Second coordinate | OO department store | OO department store |
| Third coordinate | http://www.efgh.com | OOO restaurant |
| Fourth coordinate | 123.123.123.123 | OOO department store |

As aforementioned, the location information, i.e. each of the first to fourth coordinates, is composed of at least one of a latitude value, a longitude value, and an altitude value for indicating a specific geographical position. In addition, a coordinate may be replaced by a set of spatial coordinates for defining a specific space.

The link information can be provided in the form of at least one of a Uniform Resource Locator (URL), a service provider's name, a domain name, and an IP address representing the service provider.

The supplementary information may include the information such as the service provider's business name to help the users recognize the business category of service provider.

Once the location information is acquired, the mobile terminal 200 looks up the mapping table to retrieve the location information and attempts to access the service provider's cyber space, i.e. the URL or IP address, mapped to the location information.

The mapping table may be stored during the manufacturing stage of the mobile terminal 200 with default values and updated with the information downloaded from a specific service server. The mapping table may be provided so as to be edited by the user. That is, the user may add new provider's information and may modify the preset information.

The display unit 260 displays visual data provided by the applications, user data input through key manipulation, and operational status of the mobile terminal 200. More particularly in an exemplary embodiment, the display unit 260 provides a User Interface (UI) screen associated with the access to the service provider's cyber space. The visual data displayed on the UI screen can present various service information provided in the cyber space. The UI screen can be implemented with the information tables as exemplified in FIGS. 1a to 1d.

The control unit 270 controls general operations of the mobile terminal 200 and signaling among internal elements. That is, the control unit 270 controls among the RF unit 210, location information reception unit 220, audio processing unit 230, input unit 240, memory unit 250, and display 260. The control unit 270 may include a data processing module including a codec and a modem.

More particularly, in this exemplary embodiment, the control unit 270 detects a location-based information service function execution command and performs access to a cyber space represented by an IP address mapped to the location information (spatial coordinate) acquired at the location where the location-based information service function execution command is input.

As aforementioned, the location-based function execution command is generated by the user's manipulation on the input unit 240. In addition, the mobile terminal 200 can be configured such that the location-based function is automatically activated when the mobile terminal 200 is positioned at a location represented by a specific spatial coordinate. Once the mobile terminal 200 is connected to the cyber space, it receives the information provided by the service provider operating the cyber space, such as advertisement information, discount information, menu information, geographical information, and coupon information in a format appropriate for the user interface of the mobile terminal 200.

The control unit 270 includes a function activator 271, a location information processor 273, a service access manager 275, and a service organizer 277 to control the location-based information service function.

The function activator 271 controls activation of the location-based information service function. In more detail, the function activator 271 converts the location information acquired in response to the location-based information service function activation command into an IP address, sends the location information to the service server, and controls access to the cyber space. The function activator 271 can control such that, when the mobile terminal 200 is located at a place represented by a specific coordinate, the location-based information service function is activated. The function activator 271 also controls the deactivation of the location-based information service function according to a user's configuration.

When the location-based information service function is activated, the location information processor 273 acquires the coordinates of the location of the mobile terminal 200 and converts the coordinates into an IP address. The location information conversion is performed with reference to the mapping table as shown in Table 1. When the mobile terminal 200 executes the location-based information service function in association with the service server, the location information processor 273 sends the coordinates acquired by the location information reception unit 220 to the service server and receives an IP address mapped to the coordinates from the service server.

The service access manager 275 controls access to the cyber space represented by the IP address corresponding to the location information. The service access manager 275 also controls access to the service server. The service access manager 275 attempts to access the cyber space or the service server by means of one of the RF unit 210 and a separate IP communication module.

The service organizer 277 organizes information provided through the cyber space in the format appropriate for the user interface. The service organizer 277 can organize and provide a location-based information service screen in various service modes and individual mode-specific service information.

Although the mobile terminal 200 is depicted with basic internal elements in FIG. 2, the configuration of the mobile terminal 200 is not limited thereto. For example, the mobile terminal 200 may further include at least one of a short range communication module, an electric transaction module, a digital broadcast reception module, an internet access module, a battery module, etc. In addition, internal elements of the mobile terminal 200 may be removed or replaced with other elements.

Until now, the structures and functions of the internal elements of the mobile terminal 200 have been described. The operations of the above structured mobile terminal 200 are described hereinafter in association with the location-based information service. Although the location-based information service method is described with reference to an exemplary embodiment, the present invention is not limited to the following embodiments and various equivalents and modifications can be made to the exemplary embodiments.

Figure 3:
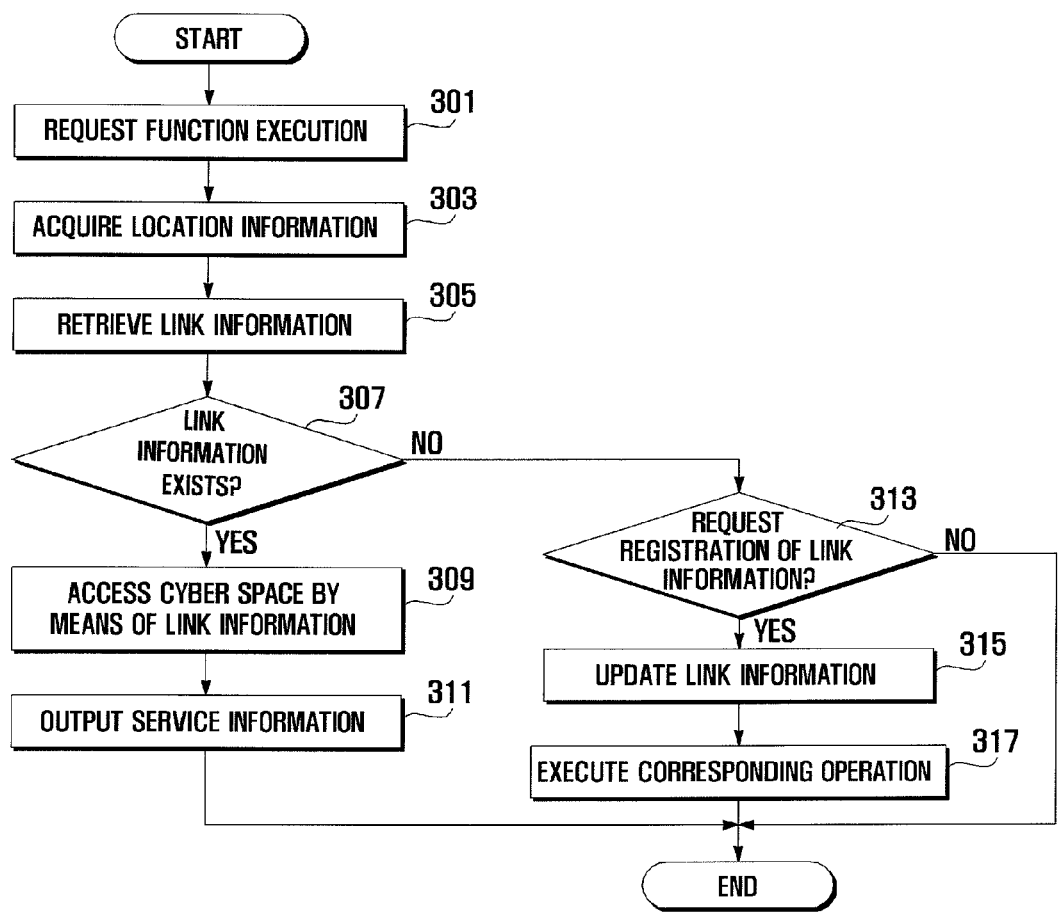
FIG. 3 is a flowchart illustrating a location-based service method according to an exemplary embodiment of the present invention.

FIG. 3 is a flowchart illustrating a location-based information service method according to an exemplary embodiment of the present invention.

Referring to FIGS. 1a to 1d, 2 and 3, once the control unit 270 detects a location-based information service request event in step S301, the control unit 270 acquires the location of the mobile terminal 200 using a coordinate received by the location information reception unit 220 in step S303.

The control unit 270 determines link information corresponding to the acquired location information in step S305. At this time, the control unit 270 compares the acquired location information with reference to at least one location information stored in the memory unit 250 to determine whether identical reference location information exists. If the identical location information exists, the control unit 270 attempts to extract the link information mapped to the location information. Extracting the link information may further include determining whether the reference location information has link information mapped thereto in step S307. The link information extraction procedure is described in more detail further below with reference to FIG. 4.

If there is link information mapped to the location information at step S307, the control unit 270 controls to access a cyber space represented by the link information in step S309. That is, the control unit 270 controls such that the mobile terminal 200 accesses a web server by providing the service provider's cyber space address corresponding to the location information.

Once the mobile terminal 200 is connected to the web server, the control unit 270 controls such that the information associated with various services provided via the cyber space is displayed on the display unit 260 in step S311. For instance, if the cyber space is of a specific department store, then the control unit 270 controls such that the mobile terminal 200 accesses the department store's cyber space with reference to the link information and outputs the information provided by the department store as the service provider. The information can be provided in the form of provider-specific service information including at least one of advertisement information, discount information, coupon information, shopping information, cultural information and the like.

If there is no link information mapped to the location information at step S307, the control unit 270 determines whether a link information setting request is input in step S313. If a link information setting request is input, then the control unit 270 updates the mapping table with the link information corresponding to the acquired location information and/or the reference location information in step S315 and executes an operation following the mapping table update in step S317. The operation following the mapping table update can be an access to the cyber space based on the updated link information or a location-based information service termination as a preset operation or in response to the user's request. The link information update procedure is described in more detail below with reference to FIG. 4.

Figure 4:
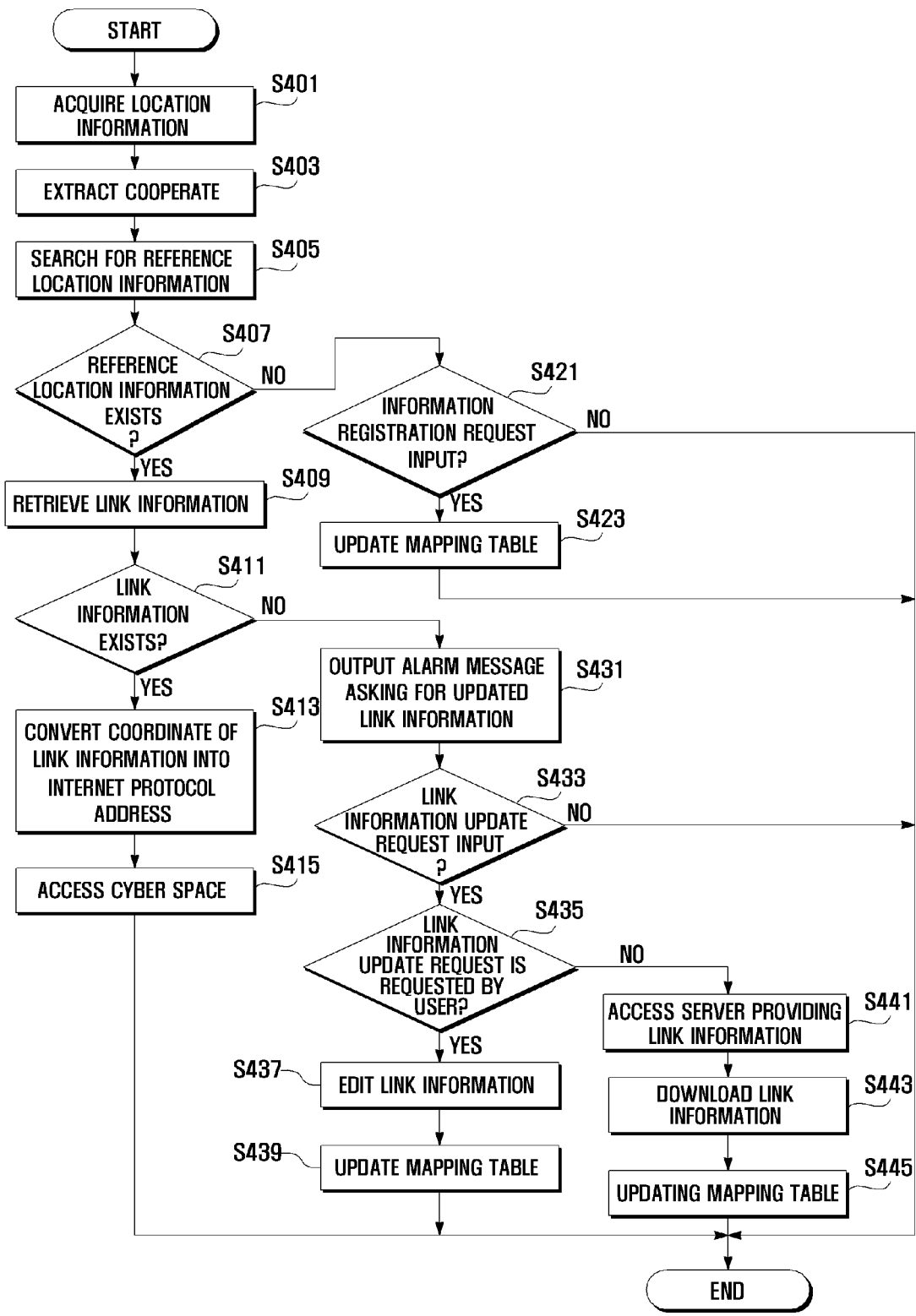
FIG. 4 is a flowchart illustrating a location-based service method according to another exemplary embodiment of the present invention.

FIG. 4 is a flowchart illustrating a location-based information service method according to another exemplary embodiment of the present invention.

Referring to FIGS. 1a to 1d, 2 and 4, the control unit 270 first acquires the location information by means of the location information reception unit 220 in step S401 and extracts at least one coordinate from the location information in step S403. Next, the control unit 270 looks up a mapping table to retrieve the corresponding reference location information in step S405 and determines whether the reference location information exists in the mapping table in step S407.

The at least one coordinate of the acquired location information includes at least one of latitude, longitude, and altitude values, and the control unit 270 retrieves the reference location information based on the at least one coordinate. The reference location information may include a coordinate, a set of coordinates, a range coordinate defining a specific geographical area, or any combination thereof.

If the reference location information exists, the control unit 270 extracts the link information mapped to the reference location information. In more detail, the control unit 270 searches for the link information corresponding to the reference location information in the mapping table in step S409 and determines whether link information mapped to the reference location information exists in step S411.

If there is not reference location information identical with the acquired location information, the control unit 270 determines if a location information registration request is input in step S421. If a location information registration request is input, the control unit 270 updates the mapping table with the acquired location information in step S423.

The location information request can be generated according to at least one of a preset configuration and a user input.

In a case where the mobile terminal 200 is configured to generate the location information request automatically, the control unit 270 recognizes that there is no reference location information corresponding to the location information and outputs a message asking for the user to register the location such that the user can register the location using the acquired location information.

In addition, the mobile terminal 200 can be configured such that, when it is determined that no reference location information corresponds to the acquired location information, the control unit 270 registers the acquired location information automatically. In this case, the control unit 220 updates the mapping table by adding the acquired location information to the mapping table and maps the location information to link information. The link information can be at least one of input by the user and downloaded from a service server.

If the link information mapped to the reference location information exists at step S411, then the control unit 270 converts the coordinate included in the link information into an IP address in step S413. That is, the control unit 270 acquires the IP address of the service provider's cyber space from the location information. Next, the control unit 270 establishes a connection to the cyber space by means of the IP address in step S415.

If there is no link information mapped to the reference location information at step S411, the control unit 270 outputs an alarm message asking for updated the link information in step S431. The alarm message asks the user to set the link information corresponding to the acquired location information.

Next, the control unit 270 determines whether a link information update request is input in response to the alarm message in step S433. The link information update request can be generated by at least one of the user's key manipulation and a preset automatic update process.

If a link information update request is detected, the control unit 270 determines whether the link information update request is input by the user in step S435. That is, the control unit 270 determines whether the link information update request is generated by the user's mapping table editing or the automatic link information download.

If it is determined that the link information update request is generated by the user, then the control unit 270 modifies the link information in response to the user request in step S437 and updates the mapping table with the modified link information in step S439.

Otherwise, if it is determined that the link information update request is generated by the automatic update process, the control unit 270 controls the mobile terminal 200 to access a specific service server in step S441 and downloads the link information corresponding to the location information or the whole set of the link information provided by the service server in step S443. The specific service server may be an information server for proving the location information (spatial coordinates) and link information (IP address) per location information such that the mobile terminal 200 can download the link information corresponding to the acquired location information or the entire location and link information provided by the information server. The control unit 270 updates the mapping table with reference to the information downloaded from the server in step S445.

Figure 5:
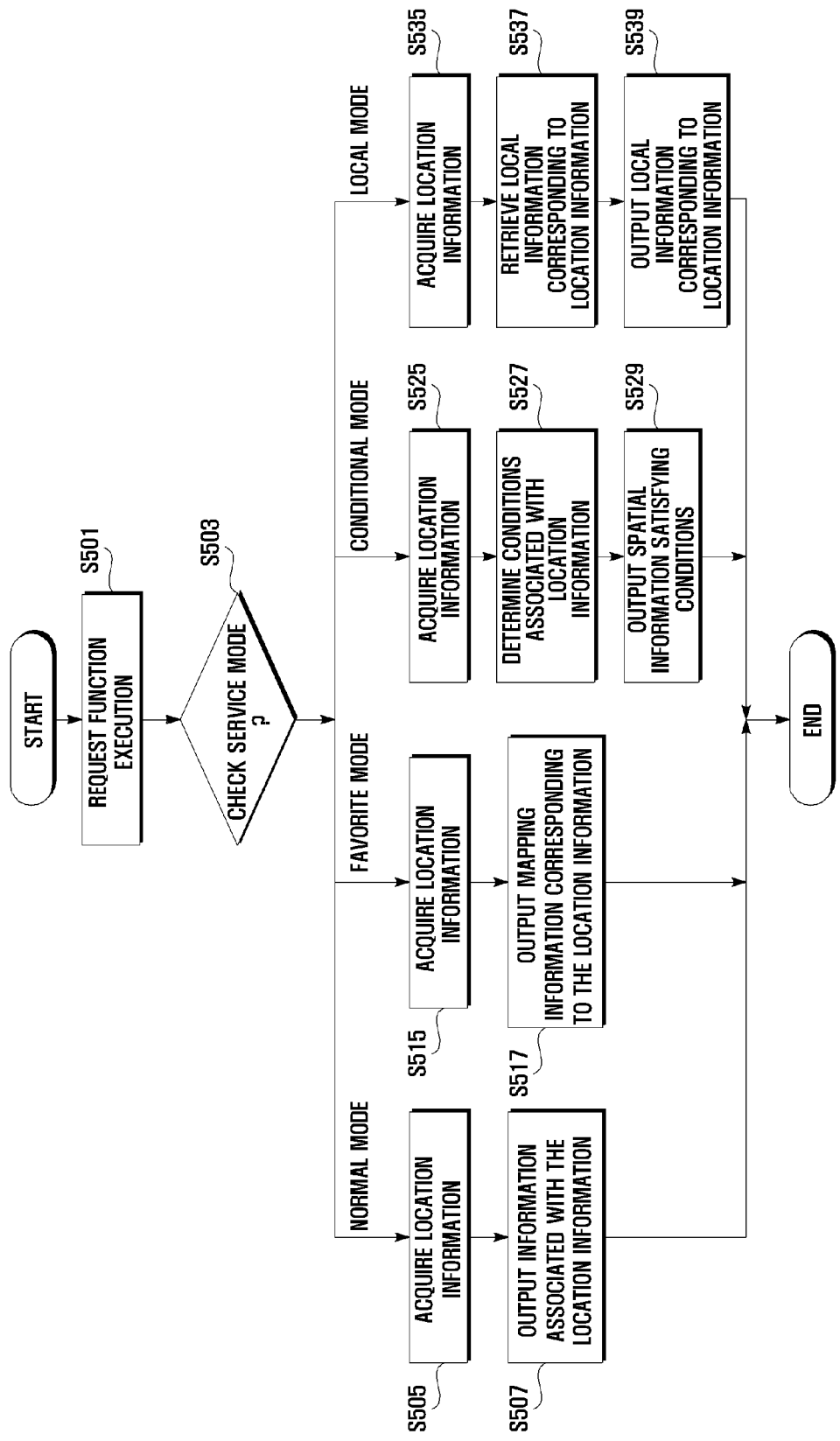
FIG. 5 is a flowchart illustrating a method for providing location-based service according to another exemplary embodiment of the present invention.

FIG. 5 is a flowchart illustrating a method for providing location-based information service according to another exemplary embodiment of the present invention.

Referring to FIGS. 1*a* to 1*d*, 2 and 5, once the control unit 270 detects a function execution request in step S501, the control unit 270 checks a service mode of the function in step S503.

If the service mode is a normal mode, the control unit 270 acquires information on the location of the mobile terminal 200 in the above described manner in step S505 and outputs the information related to the location in step S507. The related information may include service information of a cyber space to connect by means of the location information.

If the service mode is a favorite information mode at step S503, the control unit 270 acquires information on the location of the mobile terminal 200 in the above described manner in step S515 and outputs mapping information corresponding to the location information in step S517. The mapping information may include the service information of the cyber space accessible with the location information and user preferred service information set by the user. The user preferred service information includes the frequently positioned location information, i.e. the information of other service providers that are referred by the user at the location. The mobile terminal 200 is configured to output the information about the service provider associated with the link information and user preferred information set by the user in the favorite information mode.

If the service mode is a conditional mode at step S503, the control unit 270 acquires information on the location of the mobile terminal 200 in the above described manner in step S525 and determines the conditions associated with the location information in step S527. Next, the control unit 270 outputs spatial information satisfying the conditions in step S529. The spatial information may include information on another location corresponding to the location.

In the conditional mode, the control unit 270 controls such that the service information of the cyber space is output together with spatial information satisfying the conditions. For instance, if the location information indicates an area A (e.g. Gangnam Station), the spatial information on area A may include the service information about an area B (e.g. Sinchon Station) and an area D (e.g. Apgujeong Station) as related information.

If the service mode is a local mode at step S503, the control unit 270 acquires information on the location of the mobile terminal 200 in the above described manner in step S535 and extracts location information about the corresponding area from the location information in step S537. Next, the control unit 270 outputs the local information corresponding to the location information in step S539.

The local information includes service information associated with the location information such as an address of the location and nearby public offices and a fire house. The local information can be the information at least one of linked to the location information stored in the memory unit and downloaded from a specific service server providing location information.

Until now, the location-based information service function is described in view of the mobile terminal 200. A technique in which the spatial coordinates are allocated to the service providers and a technique in which the location-based information service is provided are described in view of the service server. However, the present invention is not limited to the exemplary embodiments described hereinafter.

Figure 6:
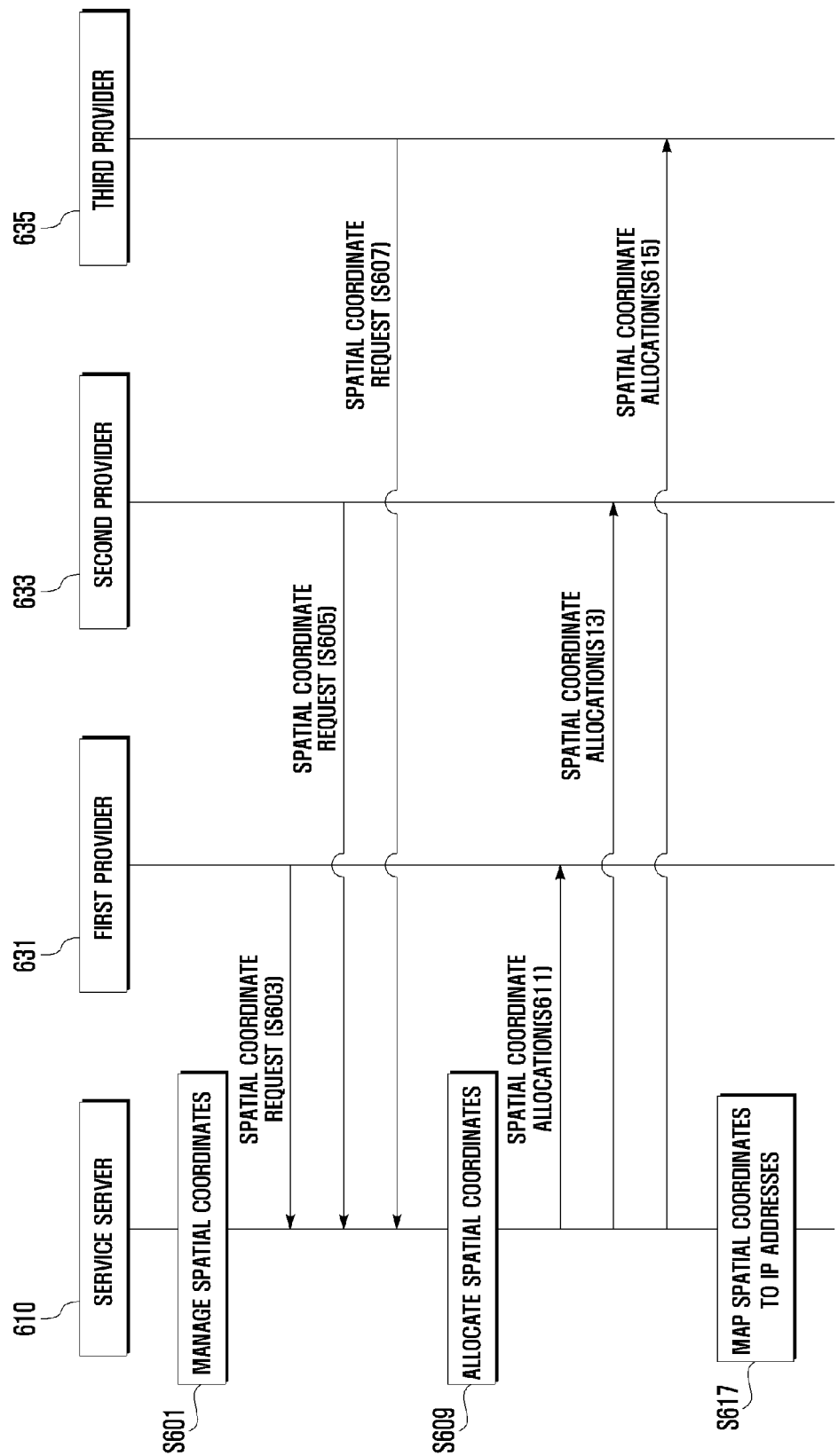
FIG. 6 is a signaling diagram illustrating a spatial coordinate allocation procedure of a location-based service method according to an exemplary embodiment of the present invention.

FIG. 6 is a signaling diagram illustrating a spatial coordinate allocation procedure of a location-based information service method according to an exemplary embodiment of the present invention.

Referring to FIG. 6, the system includes a service server 610 which allocates spatial coordinates to service providers and provides mobile terminals location information (spatial coordinates) and link information (IP addresses), and first to third service providers 631, 633, and 635 that request from the service server 610 the spatial coordinates and provides the mobile terminals with information services at their locations represented by the spatial coordinates.

The service server 610 regards the spatial coordinates as resources and allocates the usage rights on the coordinate resources to the main providers 631, 633, and 635 as pay resources. In this case, the providers 631, 633, and 635 may compete to preoccupy the coordinate resources distributed over their shopping centers for spatial coordinate-based target marketing with spot advertisement.

When a plurality of sub-providers are located in a building (e.g. a shopping center complex), there can be a main provider for managing the coordinate resources. In this case, the main providers compete to occupy the coordinate resources at and around their shopping centers and lend the coordinate resources to the sub-providers differentially such that, when a mobile terminal is located at a specific position represented by the spatial coordinate owned by a sub-provider, the sub-providers information is output with the main provider's information on the mobile terminal.

For example, when a restaurant is located on a specific floor of the shopping center building and a user carrying the mobile terminal moves to the specific floor, the mobile terminal may receive the service information of the shopping center as the main information and the service information of the restaurant as the sub information. The service information of the shopping center as the main information and the service information of the restaurant as the sub information may be simultaneously received.

It is possible to provide the service information of multiple sub-providers located on the same floor, which may occur simultaneously. In addition, the sub-providers may compete to occupy the coordinate resources. In this case, the service information of the sub-provider that occupies the spatial coordinate can be provided as the primary information.

Accordingly, the owner of the mobile terminal can obtain position-adaptive information while moving around the shopping center.

Referring to FIG. 6, the service server 610 first acquires and manages the spatial coordinates in step S601. The first, second and third providers 631, 633, and 635 send a coordinate resource allocation request to the service server 610 for preoccupying their preferred coordinate resources in steps S603, S605, and S607.

Upon receipt of the coordinate resource allocation requests, the service server 610 determines the requested coordinate resources for the providers 631, 633, and 635 in step S609 and allocates the coordinate resources to the providers 631, 633, and 635 in steps S611, S613, and S615. The allocation of the coordinate resources in step S609 may be in a first come first served order. Finally, the service server 610 maps the spatial coordinates to the IP addresses of the respective providers 631, 633, and 635 in step S617.

Once the coordinates are mapped to the IP addresses of the service providers 631, 633, and 635, the service server 610 can inform the mobile terminal located at at least one specific coordinate of the IP address of the service provider allocated the at least one coordinate. A technique for providing the location-based information service to the mobile terminals in the system, in which the service server allocates the coordinate resources to the service providers and maps the coordinates to the IP addresses of the service providers, is described hereinafter.

Figure 7:
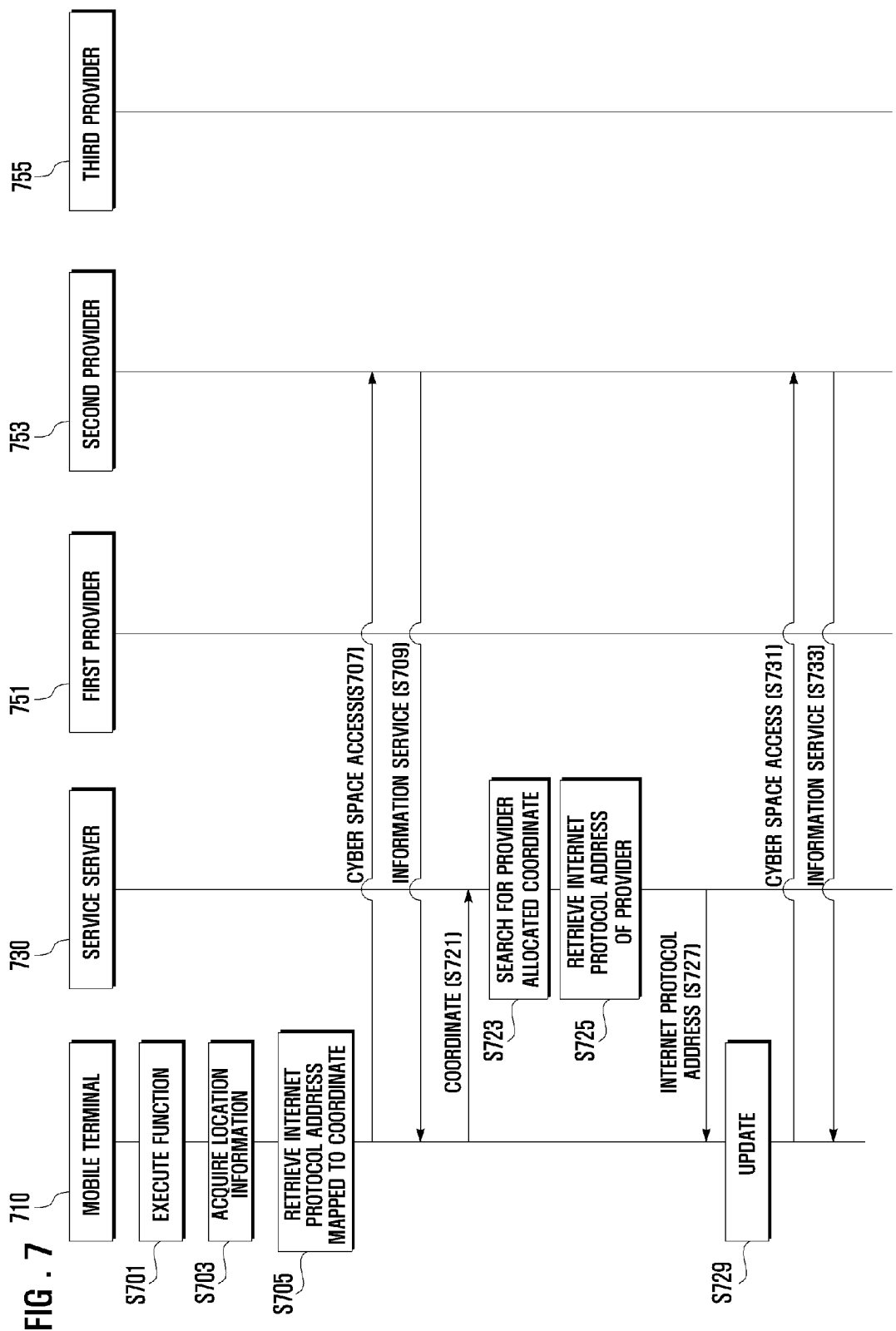
FIG. 7 is a signaling diagram illustrating an information service provision procedure of the location-based service method according to an exemplary embodiment of the present invention.

FIG. 7 is a signaling diagram illustrating an information service provision procedure of the location-based information service method according to an exemplary embodiment of the present invention. In FIG. 7, a mobile terminal 710 converts at least one coordinate of its location into an IP address and accesses the cyber space represented by the IP address.

Referring to FIG. 7, once a location-based information service function is activated in step S701, the mobile terminal 710 acquires its location in the above described manner in step S703.

Next, the mobile terminal 710 retrieves the IP address mapped to the coordinate representing its location in step S705. After retrieval of the IP address, the mobile terminal 710 accesses the cyber space of a service provider (e.g. second provider 753) represented by the IP address in step S707 and receives an information service provided by the second provider 753 in step S709. In this exemplary embodiment, it is assumed that there are three service providers 751, 753, and 755.

When the mobile terminal 710 fails retrieving the IP address of the second provider 753, the mobile terminal 710 sends at least one coordinate of its location to a service server 730 in step S721.

Upon receipt of the at least one coordinate of the mobile terminal 710, the service server 730 searches for a provider allocated the at least one coordinate in step S723. If the provider allocated the at least one coordinate is found, the service server 730 sends the IP address of the found service provider (i.e. the second provider 753) in step S725 and sends the IP address to the mobile terminal 710 in step S727.

Upon receipt of the IP address of the second provider, the mobile terminal 710 updates its mapping table with the IP address in step S729. Next, the mobile terminal 710 accesses the cyber space of the second provider 753 represented by the IP address in step S731 and receives the information service provided by the second provider 753 in step S733.

Figure 8:
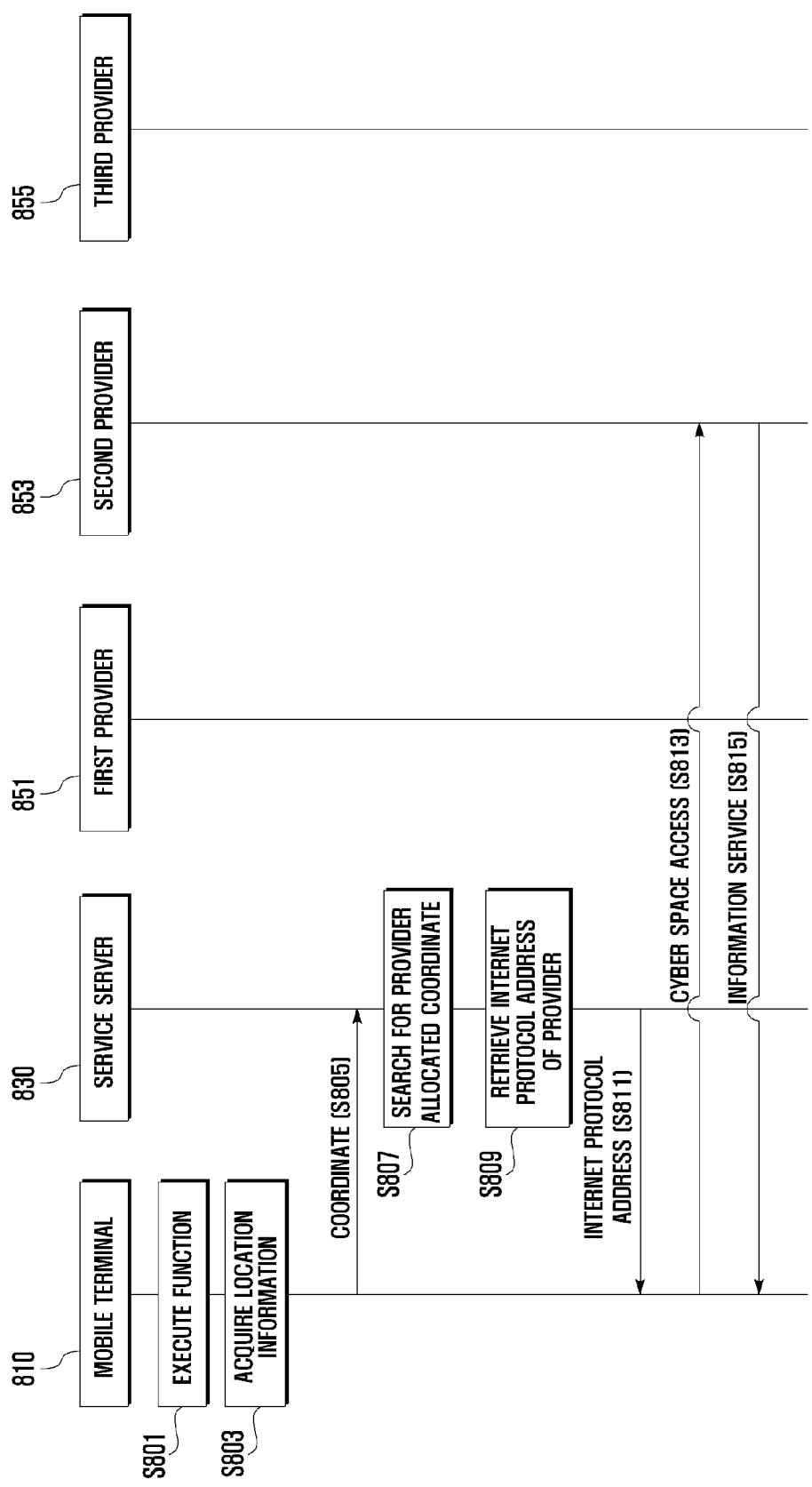
FIG. 8 is a signaling diagram illustrating an information service provision procedure of the location-based service method according to another exemplary embodiment of the present invention.

FIG. 8 is a signaling diagram illustrating an information service provision procedure of the location-based information service method according to another exemplary embodiment of the present invention. In FIG. 8, a mobile terminal 810 receives an IP address mapped to at least one coordinate representing the mobile terminal's 810 location and accesses the cyber space by means of the IP address.

Referring to FIG. 8, once a location-based information service function is activated in step S801, the mobile terminal 810 acquires its location in the above described manner in step S803.

Next, the mobile terminal 810 sends its location to a service server 830 in step S805. Upon receipt of the location information of the mobile terminal 810, the service server 830 searches for a service provider matched with at least one coordinate indicating the location of the mobile terminal 810 in step S807. In this exemplary embodiment, it is assumed that there are three service providers 851, 853, and 855, and the found service provider is the second provider 853.

Next, the service server 830 retrieves the IP address allocated to the second service provider 853 in step S809 and sends the IP address of the second service provider 853 to the mobile terminal 810 in step S811.

Upon receipt of the IP address of the second service provider 853, the mobile terminal 810 accesses the cyber space of the second provider 853 by means of the IP address in step S813 and receives the information service provided by the second provider 853 in step S815.

As described above, the location-based information service method and a mobile terminal for implementing the method according to exemplary embodiments of the present invention enables accessing a cyber space of a service provider of which an IP address is mapped to at least one coordinate of the mobile terminal's location, whereby the owner of the mobile terminal can obtain the information provided by the service provider occupying the at least one coordinate. In addition, the location-based information service method of exemplary embodiments the present invention enables the mobile terminal to access a cyber space of a service provider automatically and receive service information provided by the service provider when the mobile terminal is located at at least one coordinate allocated to the service provider. The location-based information service method of exemplary embodiments the present invention enables mapping spatial coordinates to IP addresses allocated to service providers, thereby providing subscribers with ambient information and expanding an applicability of spatial coordinate-based information services in various business models.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
   acquiring location information of an electronic device;
   obtaining link information to be used in presenting service information to a user, based at least in part on determining whether the link information corresponds to the location information and is stored in the electronic device; and
   displaying the service information, the service information being obtained from another electronic device based at least in part on the link information,
   wherein the obtaining comprises:
      extracting the link information corresponding to the location information if the link information is stored, and receiving the link information corresponding to the location information from the user or the another electronic device if the link information is not stored.

2. The method of claim 1, wherein the location information comprises at least one of a coordinate, a set of coordinates, or a coordinate range, that are acquired via a global positioning system or a base station.

3. The method of claim 1, wherein the obtaining further comprises:
adding the location information in a mapping table,
receiving the link information based at least in part on the location information, and
storing the link information in the mapping table, as corresponding to the location information.

4. The method of claim 1, wherein the obtaining further comprises:
identifying, from information received from an external electronic device, the link information corresponding to the location information.

5. The method of claim 1, wherein the service information comprises at least one of advertisement information and map information.

6. The method of claim 1, wherein the service information comprises at least one of an indication representing frequently positioned location information, and contents associated with information that the user of the electronic device has referred.

7. The method of claim 1, wherein the service information comprises:
content representing the location information and representing another location information that satisfies a specified condition.

8. The method of claim 1, wherein the service information is outputted via an audio signal.

9. The method of claim 1, wherein the service information comprises:
local information corresponding to an area within a specified range of the location information.

10. An apparatus comprising:
a display configured to present service information;
a memory configured to store link information corresponding to location information of the apparatus; and
a controller operatively coupled with the display and the memory, the controller configured to:
acquire the location information,
obtain link information to be used in presenting service information to a user, based at least in part on determining whether the link information corresponds to the location information and is stored in the apparatus,
extract the link information corresponding to the location information if the link information is stored,
receive the link information corresponding to the location information from the user or another apparatus if the link information is not stored, and
display the service information, the service information being obtained from the another apparatus based at least in part on the link information, via the display.

11. The apparatus of claim 10, wherein the service information comprises at least one of advertisement information and map information.

12. The apparatus of claim 10, wherein the controller is further configured to:
store the location information in the memory;
receive the link information based at least in part on the location information; and
store the link information in the memory, as corresponding to the location information.

13. The apparatus of claim 10, wherein the controller is further configured to:
identify, from information received from an external apparatus, the link information corresponding to the location information.

14. The apparatus of claim 10, wherein the service information comprises at least one of an indication representing frequently positioned location information, and contents associated with information that the user of the electronic device has referred.

15. The apparatus of claim 10, wherein the service information comprises contents representing the location information and representing another location information that satisfies a specific condition.

16. The apparatus of claim 10, wherein the service information is outputted via an audio signal.

17. The apparatus of claim 10, wherein the service information comprises local information corresponding to an area within a specified range of the location information.

18. A non-transitory machine-readable storage medium storing instructions that, when executed by one or more processors, cause the one or more processors to perform operations comprising:
acquiring location information of an electronic device;
obtaining link information to be used in presenting service information to a user, based at least in part on determining whether the link information corresponds to the location information and is stored in the electronic device; and
displaying the service information, the service information being obtained from another electronic device based at least in part on the link information,
wherein the obtaining comprises:
extracting the link information corresponding to the location information if the link information is stored, and
receiving the link information corresponding to the location information from the user or the another electronic device if the link information is not stored.

* * * * *